US010824942B1

United States Patent
Bhotika et al.

(10) Patent No.: US 10,824,942 B1
(45) Date of Patent: Nov. 3, 2020

(54) VISUAL SIMILARITY AND ATTRIBUTE MANIPULATION USING DEEP NEURAL NETWORKS

(71) Applicant: A9.com, Inc., Palo Alto, CA (US)

(72) Inventors: Rahul Bhotika, Bellevue, WA (US); Avinash Aghoram Ravichandran, Shoreline, WA (US)

(73) Assignee: A9.COM, INC., Palo Alto, CA (US)

( * ) Notice: Subject to any disclaimer, the term of this patent is extended or adjusted under 35 U.S.C. 154(b) by 845 days.

(21) Appl. No.: 15/483,378

(22) Filed: Apr. 10, 2017

(51) Int. Cl.
| G06N 3/08 | (2006.01) |
| G06Q 30/06 | (2012.01) |
| G06F 16/51 | (2019.01) |
| G06F 16/56 | (2019.01) |
| G06F 16/583 | (2019.01) |
| G06Q 50/00 | (2012.01) |

(52) U.S. Cl.
CPC ............... *G06N 3/08* (2013.01); *G06F 16/51* (2019.01); *G06F 16/56* (2019.01); *G06F 16/583* (2019.01); *G06Q 30/0643* (2013.01); *G06Q 50/01* (2013.01)

(58) Field of Classification Search
CPC .............................. G06Q 30/0641; G06F 3/01
USPC ....................................................... 706/15, 45
See application file for complete search history.

(56) References Cited

U.S. PATENT DOCUMENTS

| 2006/0112092 A1* | 5/2006 | Ziou | ................. G06F 16/54 |
| 2011/0081089 A1* | 4/2011 | Mori | ................. G06K 9/00281 |
| | | | 382/218 |
| 2017/0039198 A1* | 2/2017 | Ramamurthy | ........ G06F 16/904 |
| 2017/0185870 A1* | 6/2017 | Romanenko | ............... G06T 7/70 |

\* cited by examiner

*Primary Examiner* — David R Vincent
(74) *Attorney, Agent, or Firm* — Hogan Lovells US LLP

(57) ABSTRACT

Embodiments described herein are directed to allowing manipulation of visual attributes of a query image while preserving the visual attributes of a query image. A query image can be received and analyzed using a trained network to determine a set of items whose images demonstrate visual similarity to the query image across a plurality of visual attributes. Visual attributes of the query image may be manipulated to allow a user to search for items that incorporate the desired manipulated visual attributes while preserving the visual attributes of the query image. Content for at least a determined number of highest ranked, or most similar, items related to the modified visual attributes can then be provided.

20 Claims, 8 Drawing Sheets

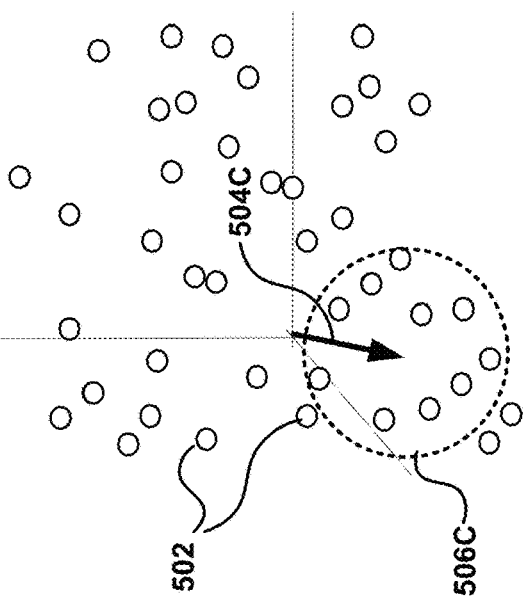
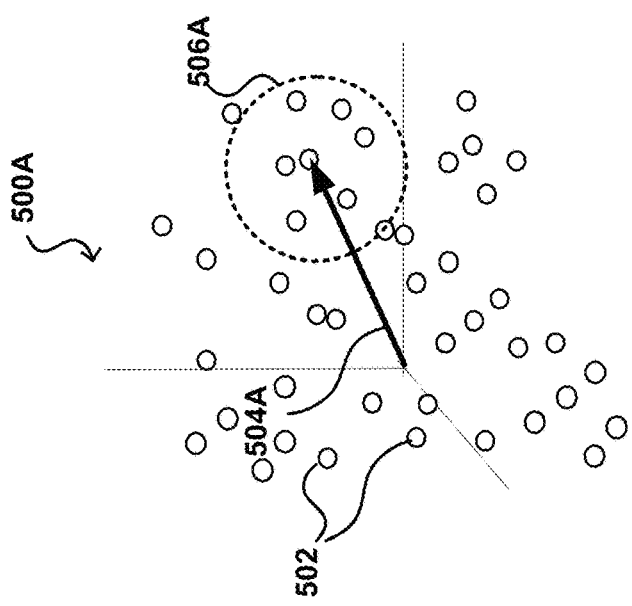
FIG. 5A
FIG. 5B
FIG. 5C

… (1)

VISUAL SIMILARITY AND ATTRIBUTE MANIPULATION USING DEEP NEURAL NETWORKS

BACKGROUND

Users are increasingly consuming content electronically, such as by accessing digital content provided over the Internet or another such network. Users often rely upon search queries or keyword strings that can be used to identify potentially relevant content. In many instances, however, the relevance depends at least in part to the actual query that was submitted, as well as the way in which the potentially relevant content is categorized or identified. There often is no easy way for a user to modify a query to express a desired refinement, and no accurate way for that expression to be implemented so as to locate the content of interest. This is particularly true for visual attributes that may be difficult to quantify through existing keyword-based approaches. Additionally, image based similarity searching requires a user to obtain an image of a product in order to find relevant results and does not allow for attribute refinements that allow a user to make changes to the visual attributes of the image query.

BRIEF DESCRIPTION OF THE DRAWINGS

Various embodiments in accordance with the present disclosure will be described with reference to the drawings, in which:

FIGS. 5A-5C illustrate example attribute manipulation processes to provide related content based at least in part upon visual similarity of feature vectors of a query image that can be utilized in accordance with various embodiments;

DETAILED DESCRIPTION

Figure 1A:
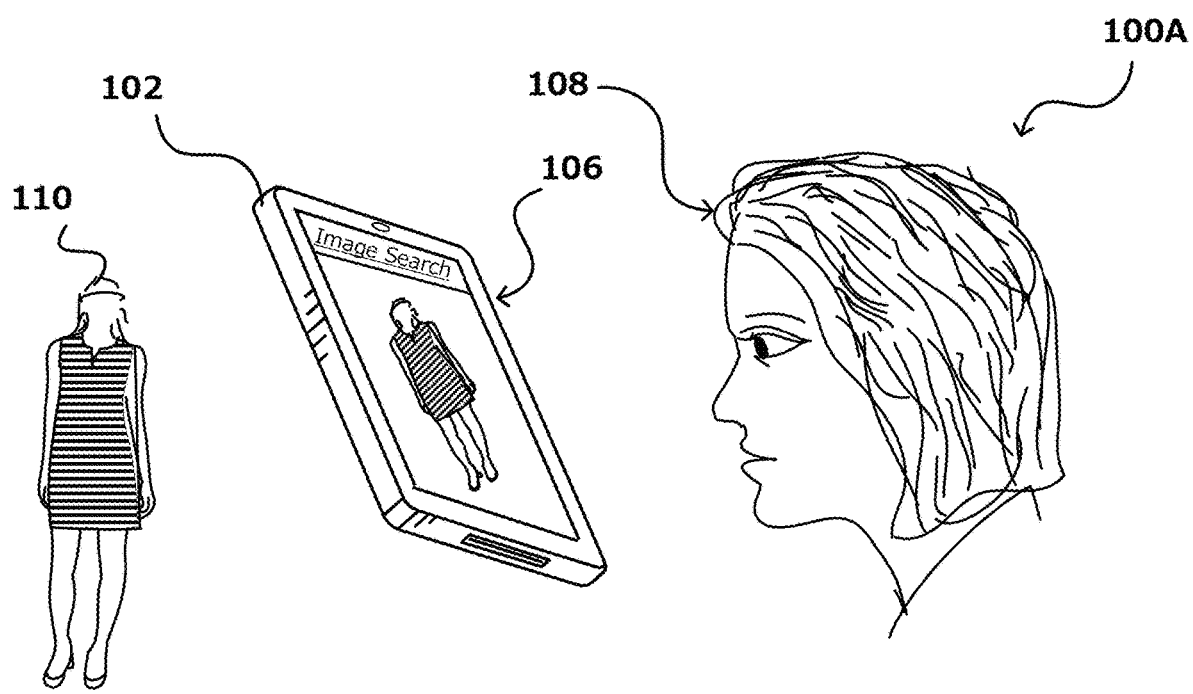
FIGS. 1A and 1B illustrate example search environments for obtaining visually similar search results in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to providing content in an electronic environment. In particular, various embodiments enable image query search results to be refined by manipulating one or more visual attributes related to an image query to find similar visual items with manipulated attributes while preserving the remaining attributes that match the image query.

Systems and methods in accordance with various embodiments of the present disclosure perform visual similarity searches as well as attribute manipulation using a single convolution neural network using multiple multi-label loss functions that allow for attributes to be manipulated while maintaining the deep neural network processing identified with the un-manipulated attributes of an image query. Accordingly, multiple attribute predictions may he generated that deliver superior visual similarity models. Furthermore, the visual attributes can be manipulated to obtain feature vectors that can be used to find products with manipulated attributes that match what the user is searching for. For instance, a user may be able to find red color shoes that look similar to their black shoes or may be able to find heeled shoes that look like their flat shoes. Accordingly, users may use the attributes of an image that they like while manipulating other attributes in order to find products that are visually similar but have the specific features they desire.

For example, in some embodiments, embodiments may include systems and methods that receive an image query including a representation of an item and process the query image using a neural network. The neural network may be trained for a plurality of visual attributes. A feature vector corresponding to a first set of visual attributes may be determined for the item as represented in the query image. Embodiments may further determine an attribute manipulation of at least one of the first set of visual attributes and determine a manipulated feature vector associated with the attribute manipulation. The manipulated feature vector may be associated with a second set of visual attributes where the second set of visual attributes have at least one different visual attribute than the first set of visual attributes. Embodiments may further provide content for at least one related item to the second set of visual attributes based at least in part upon a similarity score of at least one of a set of images to the manipulated feature vector. The similarity scores can be output from the network or determined using distances in attribute space, among other such options. Content for at least a determined number of highest ranked, or most similar, items can then be provided in response to the manipulated visual attributes of the image query.

Various other functions can be implemented within the various embodiments as well as discussed and suggested elsewhere herein.

FIG. 1A illustrates an example search environment 100A that can be presented in accordance with various embodiments. User 108 can use computing device 102 to search for items through an image search service. Using an appropriate application executing on computing device 104, the user is able to choose a type of search to perform (e.g., an image search) to obtain a list of matching items. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, and portable media players, among others.

As shown in FIG. 1A, user 108 can use an image capture device built into the computing device 102 to take a picture 106 of an object 110. For example, user 108 may not know the terms to use to identify particular aspects of an object 110, a brand associated with the object 110, and/or the object 110 or features of the object 110 may be difficult to describe. For instance, the user may have a set of dress shoes that they really like but they may want to find similar shoes in a less formal style (e.g., without heels). The user may know that they like how the shoe looks but may not be able to describe through keywords or text the features of the shoes that they are looking for. As another example, the user 108 may like a dress they see but may want to change certain aspects of it or find similar dresses that have some different characteristics or attributes. The user may not be able to describe the changes that they would make to the dress in order to find the dress without using the visual features of the dress. In some embodiments, the user 102 may capture a picture 106 of the object (e.g., dress) 110 in order to search for similar dresses that may be available.

Figure 1B:
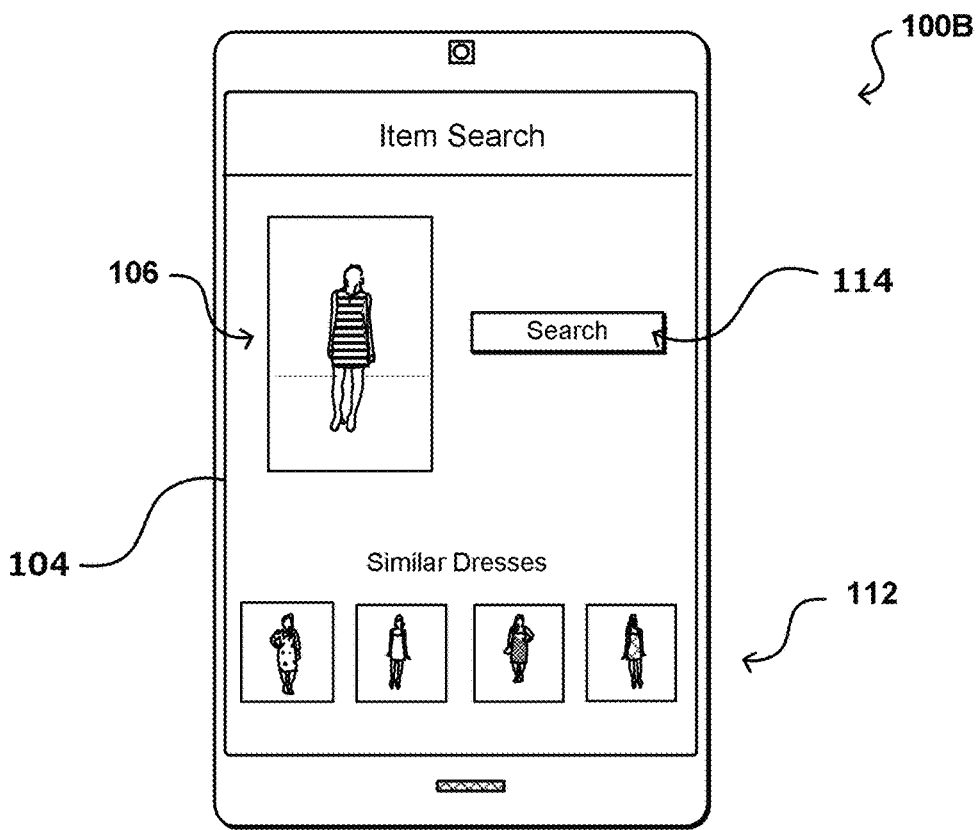

FIG. 1B illustrates an example search interface display 100B that can be presented in accordance with various embodiments. As shown in FIG. 1B, a search interface display 104 on computing device 102 can allow a user to perform an image search in which the user may begin a search by capturing an image 106 associated with the object 110 in which they desire to find related products or content. In some embodiments, the user 108 can upload an image previously captured or downloaded from a source other than the image capture device. As discussed further below, the image 106 can be analyzed to determine one or more features that may be used to match products and obtain search results associated with the captured image 206.

In this example a search image 106 has been obtained and a search interface element 114 has been pressed in order to obtain a set of search results 112 determined and returned for presentation in response to the request. Conventional methods for locating search results in response to a query are well known in the art and as such will not be discussed herein in detail. In this example the user has submitted an image query including a picture of the dress they like and the returned search results have been determined to be relevant in some way to the image of the dress. This can be due to a categorization of the results, keywords associated with the results, or tags applied to the result, among other such options. The user can scroll or otherwise navigate through the results to determine whether any of the results are of interest to the user.

Figure 2A:
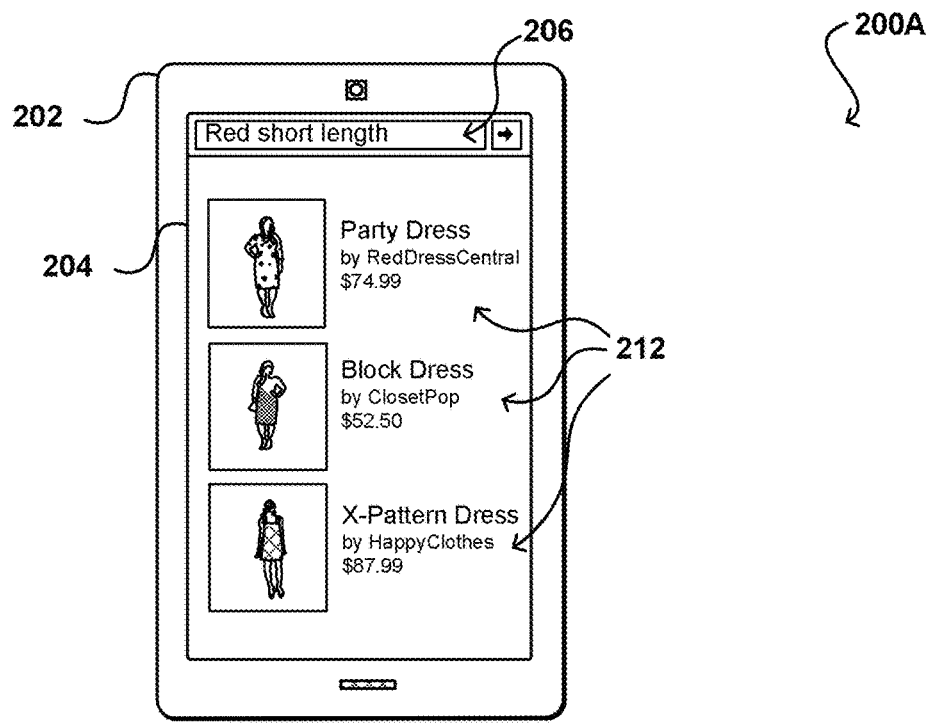
FIGS. 2A and 2B illustrate example results that may or may not be located using keyword-based attribute refinements and the attributes that led to the example results.

However, the user may want to change the search query in order to change the results of the search. For example, there may be too many results 112 returned and the user is not finding items of interest in an initial subset of the results. Accordingly, the user might want to narrow the query in order to obtain search results that are more relevant to the user based on the user's current interest. For example, FIG. 2A illustrates an updated set of search results 212 returned for a follow-up query 206 that specifies a color for the dress, "red," and a length of the dress, "short length." The updated set will likely include results 212 that have been classified as red dresses, as having a "short length," or at least have the terms "red," "short," and/or "length," in the description, etc. Accordingly, from the visually similar dresses that were returned for the image query in FIGS. 1A-1B, any dresses that are red, have a short length, and/or are associated with the keywords "red" or "short length" may be presented as the most relevant to the follow-up search.

There are various downsides to such approaches, however. For example, dresses may be available that are red or have a similar color to red as well as having a short length that may not appear in the updated results because the dresses are not categorized, classified, or otherwise identified as being visually similar to the image query. Further, short length is a subjective descriptor and dresses that are categorized as short by one person may not match the desires of the user. Additionally, there may be many visual attributes that a user might specify, such as length, shape, pocket style, sleeve style, and the like, and it will often be the case that content for dresses will not include information for all of these attributes, let alone all possible options for each attribute. Thus, a keyword-based approach will likely miss some of the relevant dresses that would otherwise correspond to the user's intent. Further, a user might have a very clear idea in her mind as to the type of result she wants to obtain, but may not know exactly how to describe the item through keywords in order to obtain the exact result. For example, the user might want to see dresses with a particular style but may not know the correct term to describe that style. For instance, it can be difficult to describe a shoe with a particular shape or a shirt top with a particular pattern. Similarly, if the user wants an item with sleeves of a certain length, there may be no consistent way of describing that particular length. As such, attribute filters or text-based searching using keywords or natural language queries can be difficult methods for a user to find a particular product, even when combined with visual image searching functionality.

Figure 2B:
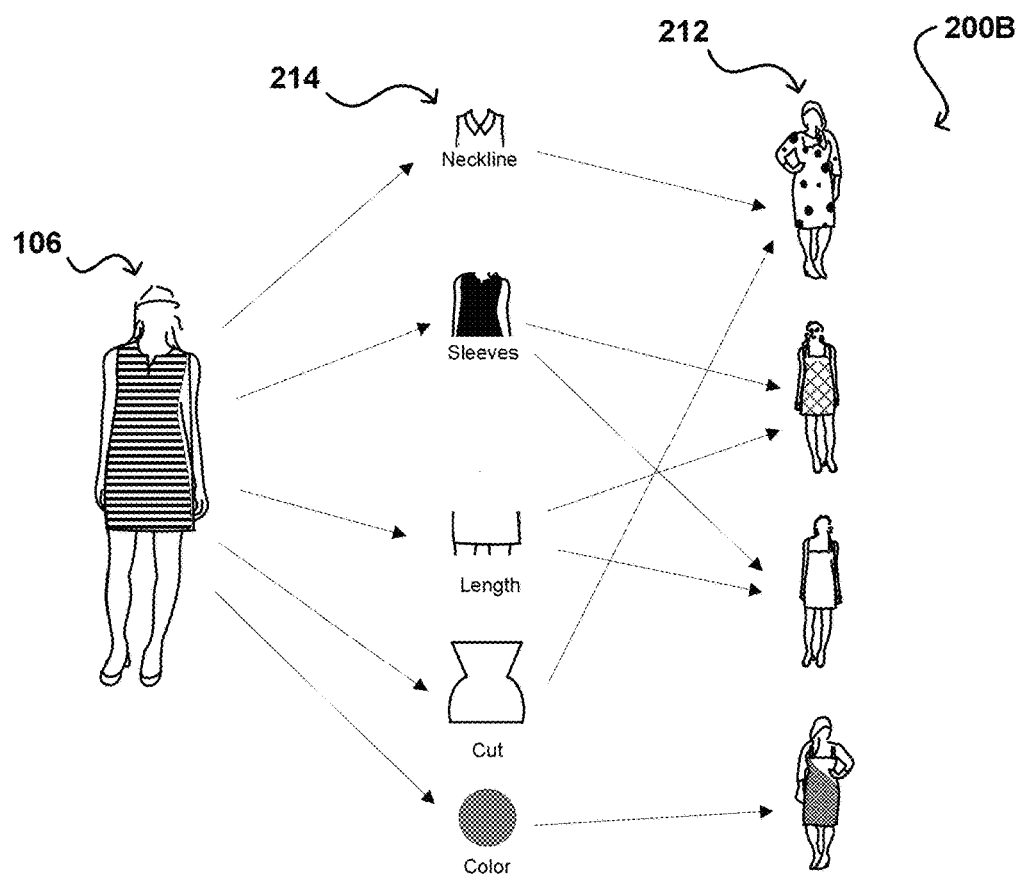

As an example, FIG. 2B illustrates how an image query 106 can have a variety of different visual aspects or attributes that may be used in finding search results 212. As can be seen in FIG. 2B, a set of search results 212 related to the image query may share one or more attributes of the image query but may not contain all of the same attributes 214 of the image query. For example, the image query may include a neckline style, sleeve length, sleeve style, hem length, dress cut, color, and/or any other suitable attributes to describe a dress in an image.

If the user added the term "red short length" to the image query 106, the search results 212 might include content that matches the keywords "red" and "short length" as well as one or more of the other visual attributes 214 of the dress 106 but the dress itself can have a different style or shape than is of interest to the user. The search results 212 may also include content for an item 206 that has the desired color or length, but may not have other attributes of interest to the user. Another result (not shown) that might be of interest to the user may not be returned if the item is not classified or tagged as having the specified color or length and might only appear if that item was determined to be relevant based on the other keywords or aspects of the query. There also can be content for another result 210 returned that is classified as having the specified color or length, but at least in the mind of the user does not include the color or length that is of interest to the user, or may have been improperly classified. Thus, it can be difficult using traditional keyword, query, and navigational approaches to refine search results (or other presentations of content) along such visual attributes.

Further, there can be some items that are not easily classifiable with a single classification. For example, an image of a dress might be presented where the dress represented in the image has a visual attributes that exhibit aspects of various types of different attributes. For example, a neckline style may have different aspects of different types of neckline styles such that it is a hybrid neckline that shares aspects of different types of necklines. It has been demonstrated that certain fashion details, such as neckline, collar, sleeve, shape, length, pocket etc., can have a significant influence on online shoppers' choices when those shoppers are searching for items with aesthetic or visual components, such as clothing items. The inherent limitation of text-based search makes it difficult to return an accurate result, especially when an item for which a customer is searching does not fit a strict or typical instance of a particular category or type of item. Further, conventional image-based recommendation systems are not particularly suitable for this task because those systems work in a holistic style.

Accordingly, approaches in accordance with various embodiments can allow users to submit image queries and manipulate attributes of the image query in order to enable users to locate results having the same visual attributes as the image query along with the manipulated visual attributes while using the original visual information for the subject image. An image query can be analyzed to identify multiple visual attributes of an item and the multiple visual attributes can be used to find the most relevant and most visually similar search results to the query image while allowing manipulations or changes to particular attributes of the query image. The applicable attributes can vary by factors such as the type or category of item and may be determined using a trained neural network to identify the relevant attributes to a particular item or image of an item. In some embodiments, the items in a category can be logically arranged in an n-dimensional multiple attribute space, or representation space, such that the various attributes can be used to refine or locate new search results based on the manipulated attributes selected by a user.

Such approaches can enable a system or service to recommend apparel products that are visually similar to query images, especially in regards to visual or fashion details, while allowing users to manipulate the visual attributes associated with a query image, without losing the visual attributes and visual similarity information of the original query image. As such, the difficult to classify and describe aspects of visual attributes are preserved to ensure the best possible search results while allowing the user to change aspects of the query image to better fit their desired products. Such a system can improve an online shopping experience, for example, in that it provides results that are consistent with customers' visual perceptions and desires. Approaches presented herein can work on catalog or other stored images, as well as mobile queries or social media images of apparel items, etc. Such approaches can also support multiple possible forms of outputs, which can simplify integration with other visual or non-visual attributes in a general-purpose apparel shopping engine or other such applications.

Figure 3A:
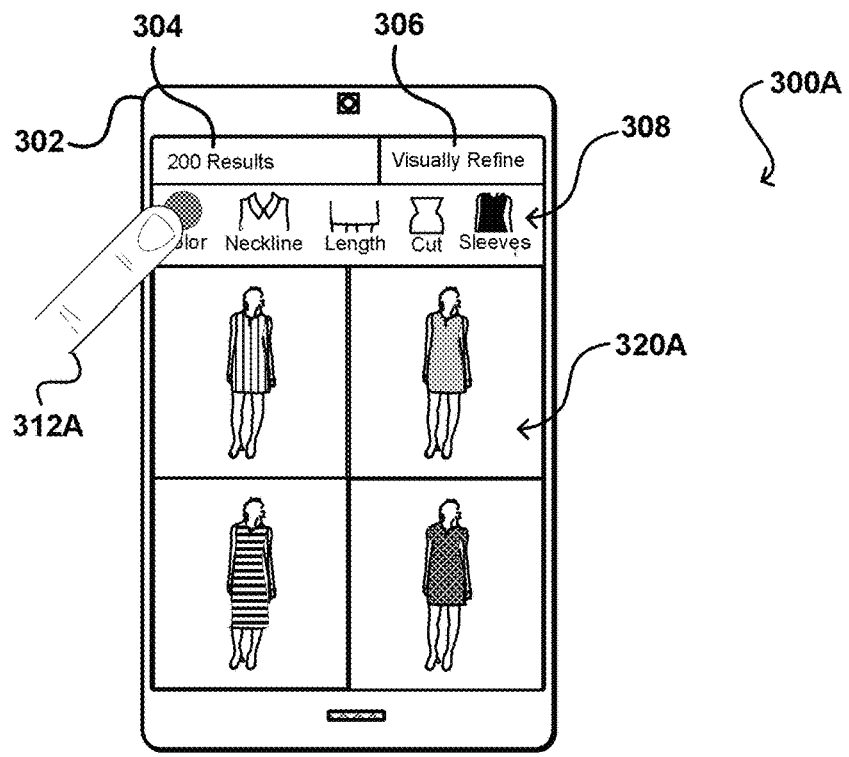
FIGS. 3A and 3B illustrate approaches to providing related content to an image query based at least in part upon visual similarity of manipulated attributes that can be utilized in accordance with various embodiments.

The ability to relate content by multiple different visual attributes enables content to be located, presented, or otherwise determined based at least in part upon the specification of those multiple attributes and allows users to better describe the visual attributes that they are looking for in a product. FIG. 3A illustrates an example display 300A that can be provided in accordance with various embodiments. The example display 450 that can be provided through a search application or other such source. In this example the user has navigated to, or otherwise been presented with, a search result page including image results 320A for an image query of an item of interest (the object 110 as shown in FIGS. 1A-1B), in this case a specific dress. Although not shown in FIGS. 3A-3B, in some embodiments, supplemental content (e.g., cost, retailer, delivery information, inventory, etc.) relating to each dress may be provided in the search results display area for each dress and/or upon one of the search results being selected. In this example, the items selected for presentation 320A are dresses that have similar visual attributes to the image search query. As described above, the search results 320A may have more than one or two similar attributes and instead may have multiple visual attributes shared with the image query. For example, the search results may be the most similar to the image query across a variety of visual attributes including neckline, length, color, cut, and sleeve style. Other visual attributes may also be provided including an item shape, an item length, a pocket style, a belt style, and/or any other suitable visual attributes that differentiate between images processed by a neural network. The search result items are selected at least partially based on the visual similarity of each of the set of visual attributes associated with the query image to ensure the most visually similar images are presented to the user as search results. Such an approach enables a user to locate items that have similar visual attributes to an item located by the user.

The example display 300A of the computing device 302 includes a search results indicator 304, a visual refinement interface element 306, a set of identified visual attribute labels 308 corresponding to the image query, and the search results 320A. The search results indicator provides a number of relevant search results that are found in response to a search to provide feedback to a user regarding whether they should broaden or narrow their search results and/or to give context on the amount of browsing of search results that are available. The visual refinement interface element 306 may allow a user to interact with visual attributes of the image query such that the user may manipulate visual attributes of the image query to find a product they desire. For example, the display 300A of FIG. 3A shows the interface of the search results page after the user has selected the visual refinement interface element 306 (when activated the visual refinement interface element may state "visually refine"). Upon interacting with the visual refinement interface element 306, a set of identified visual attribute labels 308 may be displayed that identifies the visual attributes associated with the image query.

The set of identified visual attribute labels 308 are presented as interface elements that may be interacted with by a user to manipulate the visual attributes of the image query in order to refine the search results of the image query. For example, a set of initial attribute labels may be determined for the image query. The set of attribute labels may correspond to a set of visual attributes associated with the image query that are determined through the use of a trained convolutional neural network. The image may be processed using a convolutional neural network that has been trained with a plurality of different trained visual attributes in order to identify a set of visual attributes of the image query. The convolutional neural network may process the query image to determine a feature vector corresponding to a first set of visual attributes of the query item. The feature vector may identify a set of visual attributes that are associated with the image query. The feature vector may be fed to a classification module that may be configured to identify a set of visual attribute labels associated with the feature vector. For example, the image query of the dress may be processed to identify a feature vector in a multi-dimensional multiple attribute space that is associated with dresses having a particular color, a neckline style, a hem length, a type of cut or style, and a sleeve style. Accordingly, the feature vector associated with the image query may be used to identify a set of visual attribute labels that characterize the visual attributes of the dress in the image query. The set of visual attributes labels 308 may be provided to the device and displayed to a user so that the user may select and manipulate any one or all of the various visual attributes associated with the image query. For example, a user may use their finger 312A (or stylus, pencil, or any other method of selecting an interface element) to select one of the visual attribute labels to manipulate to find other types of search results. For instance, in FIG. 3A, the user may determine they desire to find similar dresses to the dress submitted in the image query but in a different color. As such, the user may select the color visual attribute label to manipulate the color of the search object in order to obtain search results having a different color than the image query.

Figure 3B:
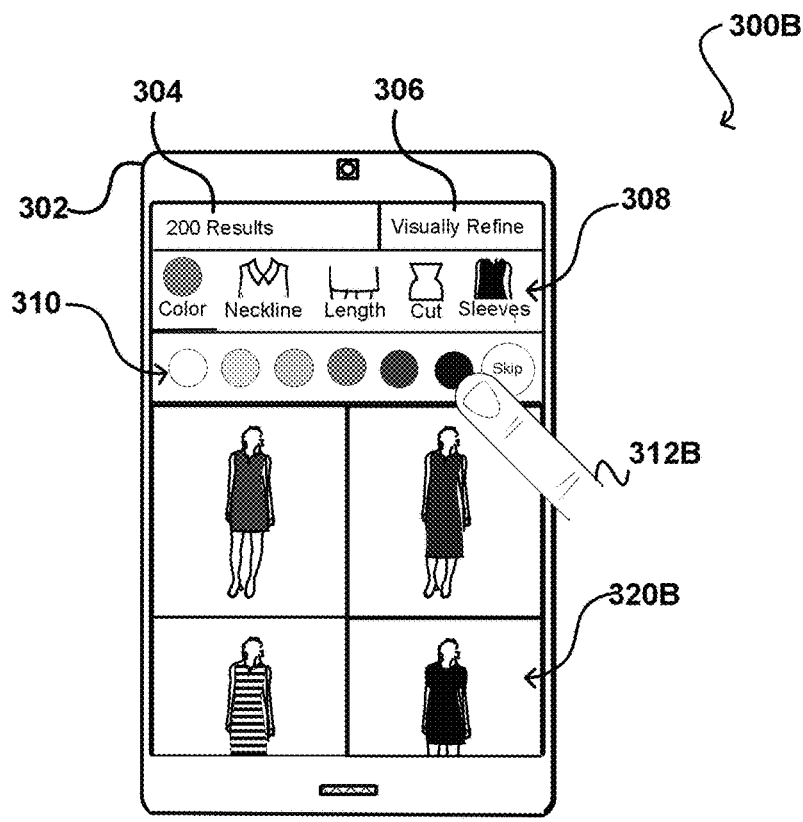

The set of visual attribute labels may have a set of attribute manipulation options associated with each of the visual attribute labels. For example, FIG. 3B illustrates the interface upon the user selecting the color visual attribute label shown in FIG. 3A. Upon selection of one of the visual attribute labels, a set of attribute manipulation options may be presented on the display that may allow a user to change a setting of one or more of the visual attributes associated with the original query image. For example, the attribute manipulation options presented for the visual attribute label of "color" includes a variety of different colors and shades of colors that have been associated with the color visual attribute label for similar dresses processed by the convolutional neural network. Any number of different options may be presented as determined by the convolutional neural network and/or classification module based on the visual differences between images processed by the system.

For example, in some embodiments, the visual attribute labels and the attribute manipulation options may be determined by the training data and the similarities between features in the training set of the images used to train the convolutional neural network. Accordingly, different sets of images that are used for training of the convolutional neural network may obtain different sets of visual attribute labels and corresponding attribute manipulation options for each of those visual attribute labels. As such, the attribute manipulation options are identified by the variations and differences between the images used to train the convolutional neural network and are not preset or categorized by text, content, and/or other options. Accordingly, the visual attributes of the types of items in the training set of images will directly influence the visual attributes and the options for manipulating those visual attributes that are presented to a user.

As shown in FIG. 3B, the user may select one of the attribute manipulation options presented to the user and the system may return an updated set of search results 320B that incorporate the manipulated attributes into the search criteria. As can be seen from the updated search results 320B, the dresses that are returned are visually similar to the previous search results since they preserve the other visual attributes of the image query but also incorporate the selected darker color of the selected attribute manipulation option for the color visual attribute of the updated search. Accordingly, embodiments of the present disclosure allow users to manipulate particular visual attributes of image queries while preserving the other image similarity visual attributes that were used to identify the initial set of search results.

Note that the search results of the updated search are not merely narrowing the visual search results of the previous image search for those results that are associated with the updated color. Instead, another search is performed using a manipulated feature vector that applies changes to the feature vector to find those dresses with the manipulated color while maintaining the other visual attributes obtained from the image query. Accordingly, the mis-categorization and missed relevant results of previous keyword-based search methods and attribute-based filtered techniques are avoided. This leads to more accurate and relevant search results being provided to a user.

As mentioned previously, in order to determine visual similarity of various items through image comparison, approaches in accordance with various embodiments can be determined through the use of machine learning approaches, such as those that utilize convolutional neural networks. The relationships between items across various visual attributes can be learned through the analysis of various types of training data. For example, deep neural networks can be trained using a set of training images exhibiting different types or values for a plurality of different attributes. The trained deep neural network can then be applied to content of one or more categories or types of items to identify similarities between the content and the trained network of images. In other embodiments, generative adversarial networks (GANs) can be used that do not require the seeding used for training deep neural networks. Various other approaches can be used as well as discussed and suggested elsewhere herein. Deep neural networks, or deep learning, can involve representing images or other content items as vectors or sets of edges or regions to simplify the learning task. These processes can allow for unsupervised learning and hierarchical feature extraction, among other such options. Deep learning algorithms can transform these inputs through multiple layers of transformation to describe causal connections between input and output. GANs can estimate a general model of such inputs using an adversarial process, as may utilize a generative model and a discriminative model. The discriminative model discriminates between different classes of data, such as a convolutional neural network trained to provide different outputs for different recognized classes. The generative model generates new data that fits the distribution of the training data. The generative model can be, for example, a Gaussian mixture model that can generate a set of points which approximately fit the training data. Various other networks or trained models can be used as well within the scope of the various embodiments. For approaches that require seeding, there can be a set of training data defined or otherwise generated for each attribute applied for a given category. The attributes can be defined by an administrator or other authorized entity, or can be learned algorithmically based on user queries, among other such options.

Figure 4:
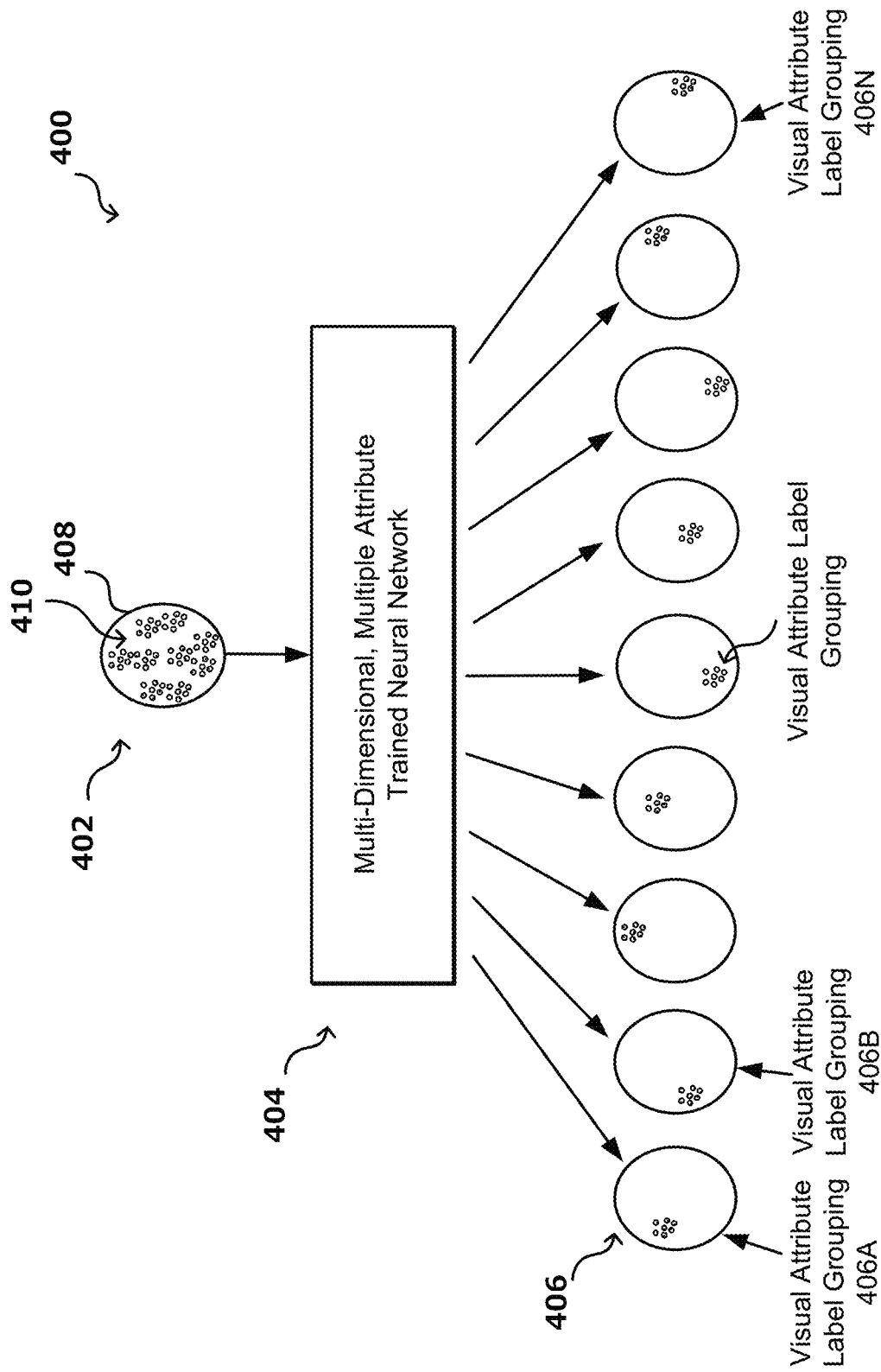
FIG. 4 illustrates an example representation of a hierarchical structure that can be used in accordance with various embodiments.

FIG. 4 illustrates an example representation of a process 400 for determining a variety of visual attribute label groupings 406 using a multi-dimensional multiple attribute trained neural network that can be used in accordance with various embodiments. As described, a plurality of images 410 for a catalog of items in an electronic catalog can be analyzed to identify visually related items. Analyzing the images to identify visually related items can include determining a feature vector for each image by processing the image using a trained multiple dimensions multiple attribute neural network 404 that is trained according to a plurality of attributes. In various embodiments, a feature vector includes multiple visual attributes that allows the resulting similarity to be defined across multiple visual attributes. In should be noted that each feature vector is associated with an image and organizing the feature vectors is, at least with respect to the hierarchical structure, synonymous with organizing the plurality of images. The visually related items processed by the same trained neural network can allow for identifying visually related items to an image query that otherwise may not have been readily identified from descriptive information received in a search. The neural network may be trained to identify a plurality of different visual attributes and may be grouped into a single multiple dimension multiple attribute neural network that is configured to identify the similarity across each of the plurality of visual attributes and generate a feature vector in a multiple dimension space that clusters the most similar images next to one another across a variety of different visual attributes. Accordingly, a feature vector may be obtained for each of the plurality of images in the multiple dimensions multiple attribute space. The processing can identify visual similarities across multiple attributes and a classifier may be used identify visual attribute label groupings corresponding to each of the clusters of feature vectors. The clusters of feature vectors may be organized into a hierarchical clustering that can include, for example, recursively partitioning the plurality of images into clusters by a classifier. In this example, the catalog of items can correspond to fashion clothing and/or dresses and the plurality of images can correspond to images of dresses. It should be noted, however, that the catalog of items can include other items such as t-shirts, shoes, rings, etc.

Prior to recursively partitioning the plurality of images into clusters/groups, the images are analyzed by the multiple dimension multiple attribute neural network 404 to determine feature vectors (not shown) for each image. The feature vectors are then classified by a classifier that is configured to identify visual attribute label groupings 406 based on the similarity between the feature vectors. The clustering can be in view of a plurality of dimensions. For example, the images can be clustered in a shape dimension, where items are clustered based on their visual similarity as it relates to shape. Other dimensions include, for example, a color dimension, a size dimension, a pattern dimension, among other such dimensions. The clustered feature vectors make up leaf nodes of a hierarchical structure of similarity across the plurality of visual attributes that the neural network is trained to identify. In some embodiments, non-hierarchical clusters may also be used. Additionally, more or fewer clusters may be created depending on the types and variety of the images being analyzed and the number of visual attributes that the neural network is trained to identify.

In accordance with various embodiments, there are a number of ways to determine the feature vectors. In one such approach, embodiments of the present invention can use the penultimate layer of a convolutional neural network (CNN) as the feature vector. For example, classifiers may be trained to identify feature descriptors (also referred herein as visual attributes) corresponding to visual aspects of a respective image of the plurality of images. The feature descriptors can be combined into a feature vector of feature descriptors. Visual aspects of an item represented in an image can include, for example, a shape of the item, color(s) of the item, patterns on the item, as well as different portions of the items as described above, etc. Visual attributes are features that make up the visual aspects of the item. The classifier can be trained using the CNN.

In accordance with various embodiments, CNNs are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling. There is an input layer 402 which along with a set of adjacent layers forms the convolution portion of the network. The bottom layer of the convolution layer along with a lower layer and an output layer make up the fully connected portion of the network. From the input layer, a number of output values can be determined from the output layer, which can include several items determined to be related to an input item, among other such options. CNN is trained on a similar data set (which includes jewelry, dresses, clothing, cars, books, food, people, media content, etc.), so it learns the best feature representation of a desired object represented for this type of image. The trained CNN is used as a feature extractor: input image is passed through the network and intermediate outputs of layers can be used as feature descriptors of the input image. Similarity scores can be calculated based on the distance between the one or more feature descriptors and the one or more candidate content feature descriptors and used for building a relation graph.

A content provider can thus analyze a set of images and determine items that may be able to be associated in some way, such as dresses or other types of clothing, in a similar style, or along other visual features. New images can be received and analyzed over time, with images having a decay factor or other mechanism applied to reduce weighting over time, such that newer trends and fashions are represented by the relations in the classifier. A classifier can then be generated using these relationships, whereby for any item of interest the classifier can be consulted to determine items that are related to that item visually. The classifier may identify a set of visual attribute labels associated with a feature vector provided by the neural network. The visual attribute label grouping 406 may include a variety of visual features associated with the item that the neural network has been trained to identify and differentiate between training images.

In various embodiments, in order to cluster items that are visually related yet distinct, it can be desirable in at least some embodiments, to generate a robust representation of items in the catalog of items. A robust representation is desirable in at least some embodiments, to cluster items according to one or more visual aspects represented in images. A CNN can be used to learn a descriptor (e.g., a visual attribute label) corresponding to a variety of visual attributes, e.g., a size, a shape, patterns, etc. of the item, etc., which may then be used to cluster relevant content. Accordingly, the CNN may be trained to identify a variety of visual attributes associated with an image and classify the image as being associated with a set of visual attributes. For example, a dress may be classified as having a red color, a "mini" length, a "sheath" cut, and being sleeve-less. Any set of relevant visual attributes may be identified such that they do not necessarily line up with traditional dress features, styles, or attributes that would commonly be used. Instead, the visual distinctions between styles, lengths, cuts, features, etc. may be identified by comparison across the training set of dress images to identify differences between the various visual attributes.

In addition to providing a cluster descriptor for each cluster, visual attribute label groupings 406 may be provided for each cluster. According to some embodiments, the visual attribute label groupings 406 may include a set of visual attribute labels that are represented by the images within the clusters. Each of the visual attribute labels may identify a visual attribute associated with the images contained therein. For example, the visual attribute label groupings 406 may include a set of visual attributes that are associated with the image contained within the cluster. For instance, using the example provided above, a visual attribute label grouping 406 may indicate that an image of a dress is associated with visual attributes including a particular color, a dress cut or style, a hem length, a type of sleeve, and/or any other suitable features that may be used to characterize and cluster visually similar images of items. Accordingly, a first visual attribute label grouping 406A may include red dresses with a mini length, a sheath cut, and no sleeves. Similarly, a second visual attribute label grouping 406B may include black dresses with a mini length, a sheath cut, and no sleeves. Each of the various attribute combinations may be identified in separate visual attribute label groupings such that all of the dresses processed by the neural network may be contained within one or more visual attribute label groupings 406. Further, the groupings may be hierarchical such that higher level clusters may include broader collections of similar visual attributes and/or less exact groupings of the various visual attributes being separated further below. For example, although not shown, the set of visual attribute label groupings 406A-406N shown in FIG. 4 may all be a part of a hierarchical set of visual attribute label groupings including shapes, colors, clothing, dresses, and/or a combination thereof as the various visual attributes of an image are analyzed and more operations are performed within the neural network.

As such, the feature vectors of the various images 408 processed by the neural network 404 may be mapped according to visual attribute label groupings 406 and the classifier may be capable of identifying or predicting the relationships between changes in visual attributes at the label grouping level 406. Accordingly, the system may be able to determine or predict mappings (e.g., an inverse matrix) that allow particular visual attributes associated with a feature vector to be manipulated in order to identify a different visual attribute label 406 grouping associated with the manipulated visual attribute. For example, if the first visual attribute label grouping 406A is associated with red dresses having a mini length, a sheath cut, and no sleeves, and a user desires to manipulate the feature vector to be associated with a black dress instead of a red dress, the system can determine a mapping (e.g., an inverse matrix) that may translate the feature vector to be associated with the change to that particular visual attribute. For example, in one embodiment, the original feature vector associated with a processed image may be mapped to a new feature vector that is associated with the change in the visual attribute learned by the neural network. For instance, the original feature vector may be multiplied by an inverse matrix that has been identified as being associated with the change in the desired visual attribute to obtain a manipulated feature vector that is associated with the second visual attribute label grouping 406B associated with a black dress, while the other visual attributes are maintained.

For example, if we let $\alpha^i_j \in \mathbb{R}^n$, where $i \in \{1, \ldots, N\}$ be the set of N attributes that are predicted after being passed through the neural network, a feature vector $f_j$ will be associated with each of these attributes. Since the attributes ($\alpha^i_j \in \{1, \ldots, N\}$) are based on a linear classifier, the relationship between attributes and features is:

$$\alpha^i_j = W_i f_j, W_i \in \mathbb{R}^{n \times f} \quad \text{(Equation 1)}$$

Stacking the matrices for each feature vector provides the matrix equation 2 below that states that the matrix of attributes is equal to the linear classifier mapping W multiplied by the feature descriptor.

$$\begin{bmatrix} a^j_1 \\ \vdots \\ a^j_i \\ \vdots \\ a^j_N \end{bmatrix} = \begin{bmatrix} W_1 \\ \vdots \\ W_i \\ \vdots \\ W_N \end{bmatrix} f_j. \quad \text{(Equation 2)}$$

Accordingly, the attribute $\alpha_j$ is equal to a linear mapping vector or relationship vector multiplied by the feature vector for a particular feature.

$$\alpha_j = W f_j \quad \text{(Equation 3)}$$

Thus, by multiplying both sides of the equation by the transpose of the linear mapping vector W, and taking the inverse of the transpose of the linear mapping vector and the linear mapping vector W, an inverse relationship between the mapping and the attribute to the feature vector may be obtained.

$$W^T \alpha_j = W^T W f_j \quad \text{(Equation 4)}$$

$$(W^T W)^{-1} W^T \alpha_j = f_j \quad \text{(Equation 5)}$$

Accordingly, given a new set of attributes $\tilde{\alpha}_j$ the manipulated feature vector $f_j$ can be calculated by multiplying the inverse of the transposed relationship mapping by the new attribute vector.

Multiple attributes may be manipulated at the same time and an inverse matrix may be identified that is associated with each of the visual attributes being manipulated in order to determine a manipulated feature vector that is associated with the manipulated visual attributes and the unchanged original visual attributes. Accordingly, embodiments allow one or more attributes to be manipulated while preserving the original visual attributes and feature vector components of the original image. Thus the most visually similar images to the original image may be found while still allowing attributes of the original image to be manipulated to better hone the search to the features the user is interested in.

FIGS. 5A-5C illustrate an example attribute manipulation process to provide related content based at least in part upon visual similarity of feature vectors of a query image that can be utilized in accordance with various embodiments. FIG. 5A shows a feature vector 504A associated with a query image that is determined before any attribute manipulation. A neural network may process the image and identify a feature vector for the query image. As described above, a feature vector can be defined in an n-dimensional multiple attribute space for each input image that is classified. For example, there may be various attributes, types, or variations for a set of visual attributes that can be represented by an axis in a multiple dimensional multiple attributes space. While this is difficult to visualize, the example plot 500A illustrated in FIG. 5A, attempts to show a cross-section view of such a multiple dimensional multiple attributes space where each axis can potentially correspond to one or more visual attributes associated with the feature vector. FIG. 5A is illustrative only and provides a partial view of feature vectors within a cluster in order to illustrate the manipulation of the feature vectors according to embodiments. In reality, more axes may be present according to the various visual attributes and layers of the neural network processing. However, for purposes of providing a visual example of the vector manipulation performed by embodiments, a feature vector of the image query is shown in FIG. 5A across one or more attributes and/or values for attributes. For example, one axis could represent a color, a type of neckline, and/or any other suitable visual attribute associated with the image query. Each axis could run from a value of 0 which can represent that the color of the dress in no way resembles that type of color, to a value of 1, for example, which indicates that with complete certainty the color of the dress in an image corresponds to this type of color. For many dresses the color and may correspond strongly to one type, but may exhibit at least some features of other types, such that a color vector for an image in attribute space may have values along multiple axes. For many dresses there will be at least some non-zero value for each axis, as colors in general exhibit some similarities so there may be at least a low value for most axes for an image. In some embodiments the value will be a confidence or match score, among other such options. A given item can then have a corresponding vector 504A in the multi-dimension multiple attribute space. Other items will also have vectors or representations 502 in that space as well. When a user wants to locate items with similar attributes to an image, the points closest to the end of that vector 504A in attribute space can be determined, and content for those items returned as similar results. These could be, for example, a minimum number of the closest points 502, or points within a specified distance or proximity region 506A around the end of the vector, among other such options. In this way, the items with the most similar visual attributes can be determined independent of the classification of the various attributes for those individual items. This vector-based approach can include any number of attributes, where the n-dimensional attribute space corresponds to the n defined attributes for that category or cluster.

FIG. 5B illustrates a process 500B of determining a manipulated feature vector upon receiving one or more manipulated visual attribute options selected by the user. The original feature vector 504A identified for the query image may be multiplied by a mapping vector (e.g., an inverse matrix 508) associated with the one or more attribute manipulations received by the user. As described above, the inverse matrix 508 may be determined by the differences in the feature vectors between different classified vector spaces of visual attribute label groupings 406. A dot product of the original feature vector and the inverse matrix may be calculated to obtain the manipulated feature vector. The inverse matrix 508 may affect the one or more visual attributes selected by the user but may keep the original visual attribute information associated with the query image largely unaltered such that the manipulated feature vector may incorporate the manipulated attributes while preserving the unchanged visual features of the query image. Accordingly, as shown in FIG. 5C, the manipulated feature vector may be mapped into a multiple dimension multiple attribute space 500C and may be different and provide different closest points within the multiple attribute multiple dimension space to identify closest items to the manipulated feature vector 504C instead of the original feature vector 504A. As such, the visual attributes may be manipulated while preserving the other visual attributes of the query image that the user was interested in.

It should be understood that in some embodiments the visual attributes may not have names or definitions that make sense to human users, but might be attributes learned through machine learning that can visually distinguish between types of items, and which can be used by analogy to find items that relate to a specified item in a way that other identified items relate to each other. Further, because the conversion of the attributes to the features includes inverting a linear system that is under constrained, more constraints can be added when compared to either a single network with a single attribute or multiple networks with single attributes. For instance, metadata based information such as price, brand, or other visual constraints that are not present in the original image may be added as attribute manipulations based on what the network learns at training. Accordingly, in some embodiments, non-visual attributes and/or visual attributes that are not associated with the original label grouping may be used to manipulate the feature vector and change the feature vector to a manipulated feature vector.

Figure 6:
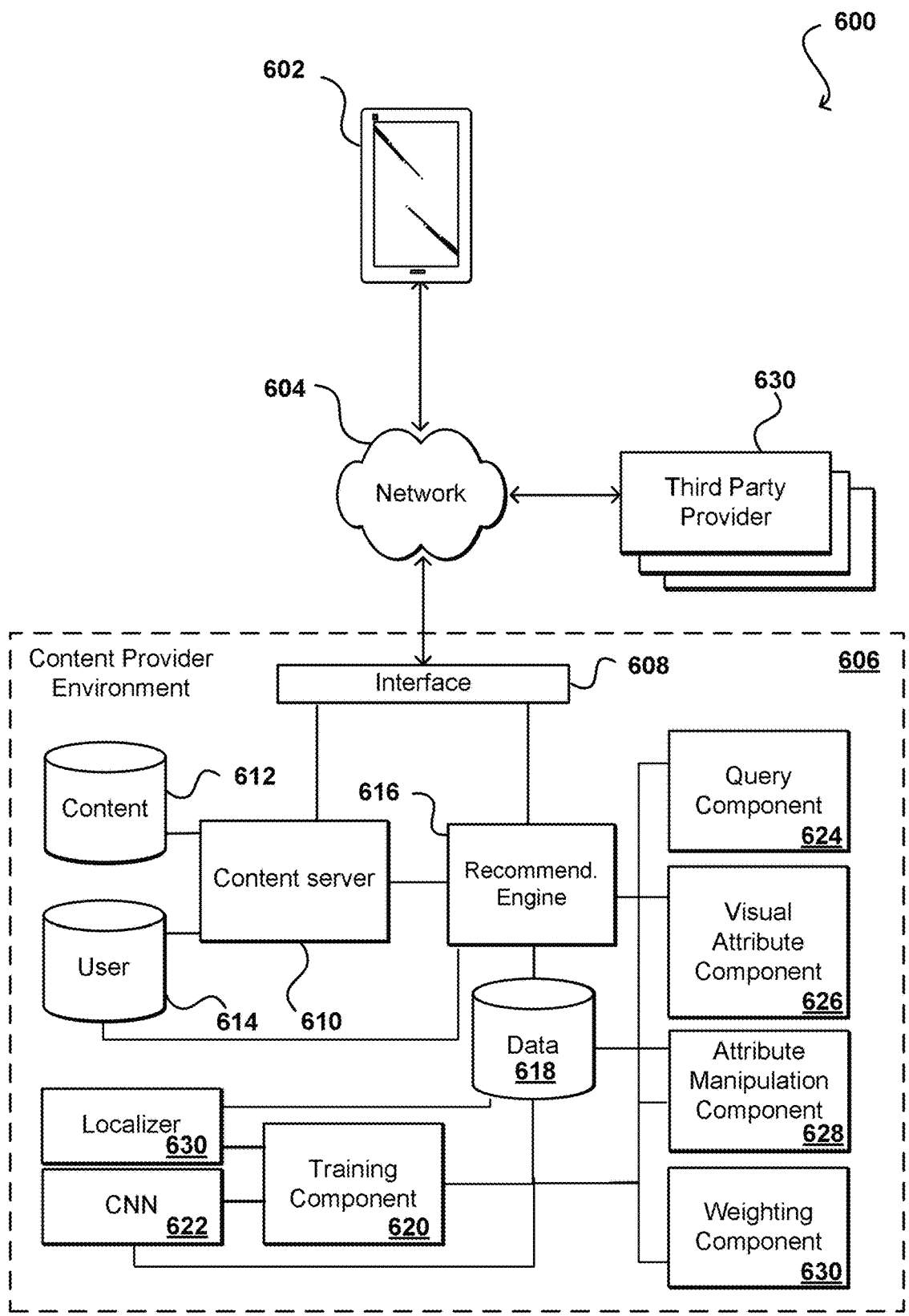
FIG. 6 illustrates an example system for performing attribute manipulation searches that can be utilized in accordance with various embodiments.

FIG. 6 illustrates an example environment 600 in which aspects of the various embodiments can be implemented. In this example, a computing device 602 is able to make a call or request across one or more networks 604 to a content provider environment 606. The network(s) can include any appropriate network, such as the Internet, a local area network (LAN), a cellular network, an Ethernet, or other such wired and/or wireless network. The content provider environment 606 can include any appropriate resources for providing content from a resource provider, as may include various servers, data stores, and other such components known or used for providing content from across a network (or from the "cloud").

In this example, a request received to the content provider environment 606 can be received by an interface layer 608 of the environment. As known for network environments, the interface layer can include components such as interfaces (e.g., APIs), load balancers, request and/or data routers, and the like. If the request is a request for content, such as for content for a page to be displayed in an application, information for the request can be directed to one or more content managers 610 and/or content servers, which can obtain the content from a content data store 614 or other such repository to be sent back across the network(s) to the computing device. In some embodiments, information for the request might also be compared against user data in a user data store 612 or other such location do determine, for example, whether the user has access rights to that content. In some embodiments user data might also be analyzed to determine which type of content to provide, additional supplemental content to provide with the primary content, and the like.

In some instances a user might want to refine the results by manipulating one or more visual attributes associated with an image query. In at least some embodiments each category or type of item may have corresponding types of visual attributes that can be manipulated to refine the results. In some embodiments an indication of these attributes can be returned with the initial results, as may be determined by the content server 610 or the recommendation engine based upon data stored in the data repository 618 or determined using a query component 624, visual attribute component 626, or attribute manipulation component 628, among other such options. When a subsequent request is received including visual attribute manipulations to one or more of those visual attributes, the recommendation engine can work with the query component 624 and the attribute manipulation component 628 to determine, among other things, the feature vector for the manipulated visual attributes and the corresponding updated most relevant search results. As mentioned, in some embodiments the request might specify rankings or magnitudes for the various attributes, which can be set in some embodiments using a weighting component 630 or other such mechanism. The information can be fed back to the recommendation engine 616 which in this example includes the refinement logic to perform the lookup against the data in the data store 618 in order to determine the refined results.

The feature vector and the manipulated feature vector can be determined at least in part using neural networks 622 such as a CNN to determine the appropriate vectors through training on an appropriate data set. The training component 620 can perform the training on the models and provide the resulting results and/or trained models for use in determining the multiple attribute feature vectors for an image query. In order to determine attributes for various content items, in at least some embodiments, some analysis of content items in an electronic catalog or other data repository is performed to determine information about the visual characteristics of the items. In some embodiments, one or more feature descriptors or vectors can be generated to describe various attributes of an image associated with a set of visual attributes associated with the image. The training component 620 can be the same system or service that is used to train the localizer 630, as well as various face detectors or other models, networks, or algorithms discussed or suggested herein.

In the example shown in FIG. 6, a neural network 622 such as a convolutional neural network (CNN) can be trained using, for example, images of objects. As mentioned, for CNN-based approaches there can be pairs of images submitted that are classified by a type of attribute, while for GAN-based approaches a series of images may be submitted for training that may include metadata or other information useful in classifying one or more aspects of each image. For example, a CNN may be trained to perform object recognition using images of different types of objects, then learn how the attributes relate to those objects using the provided training data. In certain embodiments, training a neural network may involve significant use of computation resources and time, such that this may correspond to a preparatory step to servicing search requests and/or performed relatively infrequently with respect to search request servicing and/or according to a schedule. An example process for training a neural network for generating descriptors describing visual features of an image in a collection of images begins with building a set of training images. In accordance with various embodiments, each image (or pair of images) in the set of training images can be associated with an object label describing an object depicted in the image or a subject represented in the image. According to some embodiments, training images and respective training object labels can be located in a data store 618 that includes images of a number of different objects.

A training component 620 can utilize the training data set to train the neural network 622. As further described, neural networks can include several learning layers in their architecture. A query image from the training data set is analyzed using the neural network to extract a feature vector from the network before the classification layer. This feature vector describes the subject and/or objects shown in the image. This process can be implemented for each of the images in the data set, and the resulting object feature vectors can be stored in a data store. In various embodiments, the resulting object feature vectors can be compressed for improved processing. For example, the object feature vectors generated by the neural network may include object feature vectors that have a large number of dimensions. The dimensions of these object feature vectors can be reduced by applying at least one of Principal Component Analysis (PCA) or Multi-Dimensional Scaling (MDS). Advantageously, such an approach can reduce storage demands and significantly improve latency performance. Additionally, such an approach can remove or at least reduce noise in the transformed space since the tailing dimensions generally correspond to noise and discarding them helps to focus on the useful signal when measuring similarities.

The initial query image in some embodiments may be received from client device 602 over network 604 and processed by query component 624. In some embodiments, the query image can be received when a selection of an image from a third party provider 632 or content provider environment 606 is selected, such as through the selection of a content item. When a query image is received, for example, a set of query object descriptors may be obtained or determined for the query image. For example, if the query image is not part of an electronic catalog and does not already have associated feature descriptors, the system may generate feature descriptors (both local feature descriptors and object feature descriptors) for the query content in a same and/or similar manner that the feature descriptors are generated for the collection of images, as described. Also, for example, if the query image is part of the collection then the feature descriptors for the query image may be obtained from the appropriate data store. Additionally, the query image can be analyzed to determine local feature descriptors for the query image. Using the clustered feature vectors and corresponding visual words determined for the training images, a histogram for the query image can be determined. The query image can also be analyzed using the neural network 622 to extract a feature vector from the network before the classification layer. This feature vector describes the subject and/or objects shown in the image. Using the local feature descriptors and object feature descriptors, visually similar images in content provider environment 606 can be identified.

The attribute manipulation component 628 may also be configured to determine attribute labels corresponding to each of the first set of visual attributes associated with the feature vector. As such, the attribute manipulation component 628 may be configured to obtain the feature vector associated with the query image and obtain a set of visual attribute labels associated with the feature vector. The visual attribute labels may identify the visual attributes associated with the image query and may include any relevant visual attributes from the image query. In some embodiments, the attribute manipulation component 628 may include a classifier that is configured to identify the set of visual attribute labels from the visual attribute label grouping referenced above in FIG. 4. Each of the visual attribute labels may be associated with attribute manipulation options that allow for changes in the settings of the set of visual attributes associated with the feature vector. Further, in some embodiments, the attribute manipulation options may include metadata as well as settings of the visual attributes identified by the visual attributes labels. The different possible settings of the visual attributes may be identified during training of the neural network for the plurality of visual attributes. For instance, the settings may include the different values associated with each of the set of visual attributes. For example, for the visual attributes of color, the settings may include red, green, blue, etc. As another example, hem length visual attributes may include visual attribute settings of mini length, maxi length, and/or any other suitable types or lengths of different types of dresses. The metadata may include content associated with the images processed during training of the neural network including price, brand, designer, and/or any other information that may be included with an image and the training set during training. The attribute manipulation component may provide the identified attribute labels and attribute manipulation options to the recommendation engine to be provided to the computing device 602 along with the similar content associated with the query image.

Further, the attribute manipulation component may receive a selection of at least one of the attribute manipulation options from the recommendation engine upon the user selecting one or more attribute manipulations associated with the result set and the query image. The attribute manipulation component may determine an inverse matrix associated with the selection of the at least one of the attribute manipulation options upon receiving the one or more attribute manipulations. The inverse matrix may be determined through any suitable method. In some embodiments, the inverse matrix may be identified by determining a setting of the at least one visual attribute being manipulated, determining a difference between the setting of the at least one visual attribute being manipulated and a manipulated setting of the at least one visual attribute for each of the at least one selected manipulation options, and determining the inverse matrix associated with the difference between the setting and the manipulated setting of the at least one visual attribute. Accordingly, the attribute manipulation component may identify the differences between settings of the visual attribute before and after the user selected the visual attribute manipulation and may identify an inverse matrix associated with that change. For example, if a dress color is changed from red to black, the attribute manipulation component 628 may identify an inverse matrix associated with a color change from red to black and determine a manipulated feature vector associated with that change. Accordingly, a manipulated feature vector may be determined by applying the inverse matrix to the feature vector where the manipulated feature vector corresponds to a second set of visual attributes. The second set of visual attributes are different than the first set of visual attributes by at least the received attribute manipulation but the remaining visual attributes within the first set and second set of visual attributes may remain the same.

Once the manipulated feature vector has been determined, a second set of similarity scores may be determined between the manipulated feature vector and a second set of result images. The second set of result images may be based at least in part upon a distance between an endpoint of the manipulated feature vector and respective endpoints for the result images in a multi-dimensional multiple attribute space. A similar process to that described above in reference to the determination of the similarity scores for the feature vector may be performed to obtain the second set of result images and corresponding content for providing to the user computing device.

Figure 7:
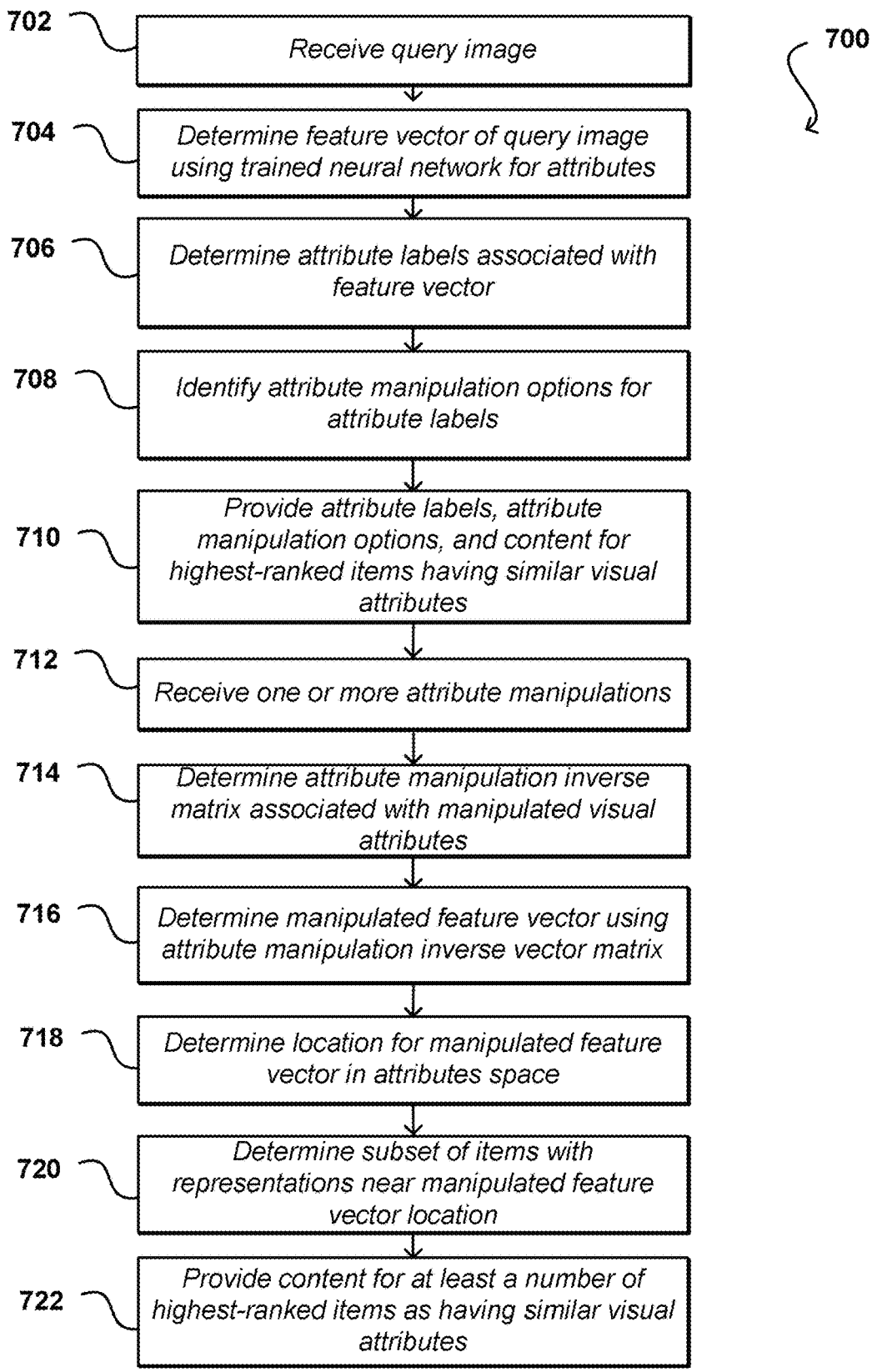
FIG. 7 illustrates an example process for determining content based upon visual attribute similarity and attribute manipulation that can be utilized in accordance with various embodiments.

FIG. 7 illustrates an example process 700 for determining content based upon visual attribute similarity and attribute manipulation that can be utilized in accordance with various embodiments. In this example, a query image is received 702. As mentioned, the query image can be received from any of a number of sources in a number of different ways. For example, the query image could be an image selected by a user or provided by the user, such as by the user capturing or uploading an image showing an item of interest. In other embodiments the query image can be associated with a navigation instruction, interface, data record, or other such source that is to be used to provide content, among others such options. A feature vector of the query image may be determined 704 using a neural network that has been trained for a plurality of attributes. The feature vector can be associated with a first set of visual attributes associated with the query image. Attribute labels associated with the feature vector may be determined 706 that identify the first set of visual attributes associated with the query image. The visual attribute labels may be identified by applying the feature vector to a classification module that identifies a set of visual attributes labels associated with the feature vector. Each of the attribute labels may be have a set of attribute manipulation options associated with the visual attribute that may be identified 708.

The attribute labels, attribute manipulation options, and content for the highest-ranked items having similar visual attributes to the feature vector may be provided 710 to a computing device. The most relevant content to the feature vector may be determined using the neural network. For example, the neural network may output a similarity score to one or more other items, or values for the attribute for the image, among other such options. The location of the item in a multiple dimension multiple attribute space can be determined, and a subset of items with representations near that location may be identified. The distances between the query item feature vector location and the locations of the various items can be determined, or their similarity scores otherwise obtained from the neural network, and the items can be ranked based at least in part upon the relative distance or similarity score. Smaller distances in attribute space can correspond to higher similarity values. Once ranked or otherwise determined, at least a number (i.e., one or more) of the highest-ranked items can have content provided as having a similar value for the set of attributes as the item represented in the query image.

A user may view the content associated with the most relevant search results and may provide one or more attribute manipulations using the attribute manipulation options associated with one or more attribute labels. The one or more attribute manipulations may be received 712 and processed to determine 714 an attribute manipulation inverse matrix associated with the one or more attribute manipulations. The attribute manipulation inverse matrix may be determined by determining a setting of the at least one visual attribute being manipulated, determining a difference between the setting of the at least one visual attribute being manipulated and a manipulated setting of the attribute manipulation of the at least one of the first set of visual attributes, and determining the inverse matrix associated with the difference between the setting and the manipulated setting of the at least one visual attribute. A manipulated feature vector may be determined 716 using the attribute manipulation inverse vector matrix by multiplying the feature vector by the determined inverse matrix.

The most relevant content to the manipulated feature vector may be determined using the neural network. For example, the neural network may output a similarity score to one or more other items, or values for the attribute for the image, among other such options. The location of the manipulated feature vector in a multiple dimension multiple attribute space can be determined 718, and a subset of items with representations near that location may be identified 720. The distances between the query item feature vector location and the locations of the various items can be determined, or their similarity scores otherwise obtained from the neural network, and the items can be ranked based at least in part upon the relative distance or similarity score. Smaller distances in attribute space can correspond to higher similarity values. Once ranked or otherwise determined, at least a number (i.e., one or more) of the highest-ranked items can have content provided 722 as having a similar value for the set of attributes as the item represented in the query image.

Figure 8:
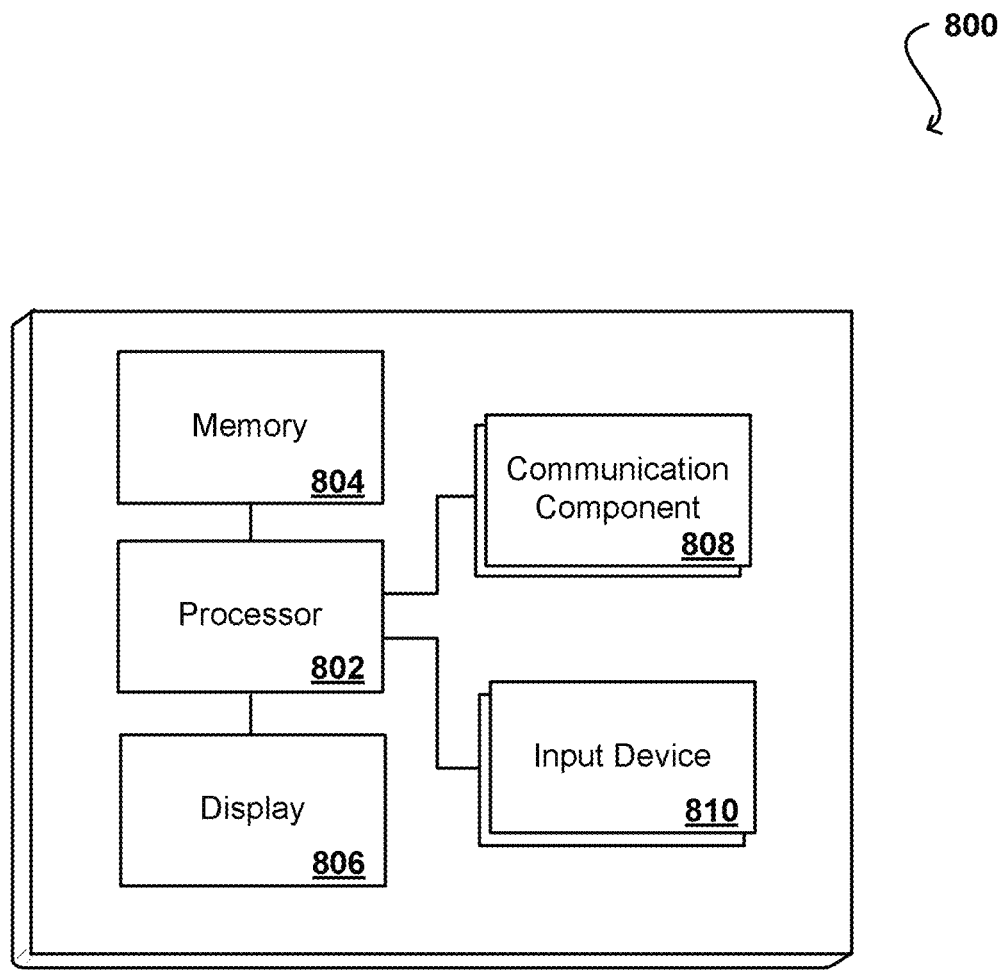
FIG. 8 illustrates example components of a computing device that can be utilized in accordance with various embodiments.

FIG. 8 illustrates a logical arrangement of a set of general components of an example computing device 800 that can be used to implement aspects of the various embodiments. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 808 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 800 of FIG. 8 can include one or more network interface elements 808 for communicating over various networks, such as a Wi-Fi, Bluetooth, RF, wired, or wireless communication systems. The device in many embodiments can communicate with a network, such as the Internet, and may be able to communicate with other such devices.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
   obtaining a query image including a representation of a query item from a camera;
   processing the query image using a neural network, trained for a plurality of visual attributes, to determine a feature vector corresponding to a first set of visual attributes of the query item as represented in the query image;
   determining a first set of similarity scores between the query image and a first set of result images based on the feature vector;
   determining attribute labels corresponding to each of the first set of visual attributes associated with the feature vector, the first set of visual attributes being a subset of the plurality of visual attributes;
   determining attribute manipulation options for each of the first set of visual attributes;
   providing content for at least a determined number of the first set of result images having highest similarity scores from the first set of similarity scores, at least one of the attribute labels, and attribute manipulation options associated with the at least one attribute label;
   receiving a selection of at least one of the attribute manipulation options;
   determining an inverse matrix associated with the selection of the at least one of the attribute manipulation options;
   determining a manipulated feature vector by applying the inverse matrix to the feature vector, the manipulated feature vector corresponding to a second set of visual attributes, the second set of visual attributes having at least one different visual attribute than the first set of visual attributes;

determining a second set of similarity scores between the manipulated feature vector and a second set of result images; and providing content for at least a determined number of the second set of result images having highest similarity scores from the second set of similarity scores.

2. The computer-implemented method of claim 1, wherein determining the first set of similarity scores further comprises:

determining the first set of similarity scores based at least in part upon a distance between an endpoint of the feature vector and respective endpoints for the result images in a multi-dimensional multiple attribute space of the first set of visual attributes.

3. The computer-implemented method of claim 1, wherein determining the second set of similarity scores further comprises:

determining the second set of similarity scores based at least in part upon a distance between an endpoint of the manipulated feature vector and respective endpoints for the result images in a multi-dimensional multiple attribute space of the second set of visual attributes.

4. The computer-implemented method of claim 1, wherein determining an inverse matrix associated with the selection of the at least one of the attribute manipulation options further comprises:

determining a setting of the at least one visual attribute being manipulated;

determining a difference between the setting of the at least one visual attribute being manipulated and a manipulated setting of the at least one visual attribute for each of the at least one selected manipulation options; and obtaining the inverse matrix associated with the difference between the setting and the manipulated setting of the at least one visual attribute from a classifier, the classifier having identified the inverse matrix through clustering of feature vectors within a multi-dimensional multiple attribute space.

5. The computer-implemented method of claim 1, wherein determining the inverse matrix further comprises:

adding metadata as an additional constraint to the inverse matrix, the metadata including content associated with the result images processed during training of the neural network.

6. A computer-implemented method, comprising:

processing a query image including a representation of an item using a neural network, trained for a the plurality of visual attributes, to determine a feature vector corresponding to a first set of visual attributes for the item as represented in the query image;

providing, via a user interface, one or more visual attribute labels and respective options associated with the one or more visual attribute labels;

receiving a user selection of an option for one of the visual attribute labels, the selected option represented by one or more feature values;

determining a manipulated feature vector, the manipulated feature vector representing a second set of visual attributes, the second set of visual attributes having at least one different visual attribute than the first set of visual attributes; and providing content for at least one related item to the second set of visual attributes based at least in part upon a similarity score of at least one of a set of images to the manipulated feature vector.

7. The computer-implemented method of claim 6, further comprising:

extracting the visual attribute labels from a label grouping corresponding to each of the first set of visual attributes associated with the feature vector; and providing the visual attribute labels as interface elements configured to allow a user to select one or more of the visual attribute labels to manipulate.

8. The computer-implemented method of claim 6, further comprising:

determining options for each of the visual attribute labels; and providing the options as interface elements configured to allow a user to manipulate settings of one or more of the visual attribute labels.

9. The computer-implemented method of claim 6, wherein determining a manipulated feature vector associated with the attribute manipulation further comprises:

determining a setting of the at least one visual attribute associated with the attribute manipulation of the at least one of the first set of visual attributes;

determining a difference between the setting and a manipulated setting of the attribute manipulation of the at least one of the second set of visual attributes; and obtaining the mapping associated with the difference between the setting and the manipulated setting of the at least one visual attribute from a classifier, the classifier having identified the inverse matrix through clustering of feature vectors within a multi-dimensional multiple attribute space; and applying the mapping to the feature vector.

10. The computer-implemented method of claim 9, wherein determining a mapping associated with the attribute manipulation of the at least one of the first set of visual attributes further comprises:

adding metadata as an additional constraint to the mapping, the metadata including content associated with the result images processed during training of the neural network.

11. The computer-implemented method of claim 6, wherein providing content for at least one related item to the second set of visual attributes based at least in part upon a similarity score to the manipulated feature vector further comprises:

determining similarity scores for each of a set of related items to the manipulated feature vector, each similarity score indicating a similarity between variations of visual attributes for a respective image of a related item and the second set of visual attributes; and providing the content for at least a determined number of the set of related items having highest similarity scores based on the second set of visual attributes.

12. The computer-implemented method of claim 11, wherein determining the similarity scores for each of the set of related items is based at least in part upon a distance between an endpoint of the manipulated feature vector and respective endpoints for the result images in a multi-dimensional multiple attribute space of the second set of visual attributes.

13. The computer-implemented method of claim 6, wherein the set of images includes representations of apparel items offered for consumption through an electronic marketplace, and wherein the visual attributes relate to fashion attributes of the apparel items.

14. The computer-implemented method of claim 13, wherein the fashion attributes include at least one of a neckline, a collar style, a sleeve style, an item shape, an item length, a pocket style, or a belt style.

15. The computer-implemented method of claim 6, further comprising:
receiving the query image from a social networking source or an electronic device used to capture the query image.

16. A system, comprising:
at least one processor; and
memory storing instructions that, when executed by the at least one processor, cause the system to:
process a query image including a representation of an item using a neural network, trained for a the plurality of visual attributes, to determine a feature vector corresponding to a first set of visual attributes for the item as represented in the query image;
provide, via a user interface, one or more visual attribute labels and respective options associated with the one or more visual attribute labels;
receive a user selection of an option for one of the visual attribute labels, the selected option represented by one or more feature values;
determine a manipulated feature vector, the manipulated feature vector representing a second set of visual attributes, the second set of visual attributes having at least one different visual attribute than the first set of visual attributes; and
provide content for at least one related item to the second set of visual attributes based at least in part upon a similarity score of at least one of a set of images to the manipulated feature vector.

17. The system of claim 16, wherein determining a manipulated feature vector associated with the manipulation further causes the system to:
determine a setting of the at least one visual attribute associated with the attribute manipulation of the at least one of the first set of visual attributes;
determine a difference between the setting and a manipulated setting of the attribute manipulation of the at least one of the second set of visual attributes; and
obtain the mapping associated with the difference between the setting and the manipulated setting of the at least one visual attribute from a classifier, the classifier having identified the inverse matrix through clustering of feature vectors within a multi-dimensional multiple attribute space; and
apply the mapping to the feature vector to obtain the manipulated feature vector.

18. The system of claim 17, wherein determining a mapping associated with the manipulation of the at least one of the first set of attributes further causes the system to:
add metadata as an additional constraint to the mapping, the metadata including content associated with the result images processed during training of the neural network.

19. The system of claim 16, wherein providing content for at least one related item to the second set of attributes based at least in part upon a similarity score to the manipulated feature vector further causes the system to:
determine similarity scores for each of a set of related items to the manipulated feature vector, each similarity score indicating a similarity between variations of attributes for a respective image of a related item and the second set of attributes; and
provide the content for at least a determined number of the set of related items having highest similarity scores based on the second set of attributes.

20. The system of claim 19, wherein determining the similarity scores for each of the set of related items is based at least in part upon a distance between an endpoint of the manipulated feature vector and respective endpoints for the result images in a multi-dimensional multiple attribute space of the second set of attributes.

* * * * *